June 7, 1927.
G. WASHINGTON
FOCUSING DEVICE FOR CAMERAS
Filed Feb. 1, 1926
1,631,299
3 Sheets-Sheet 1
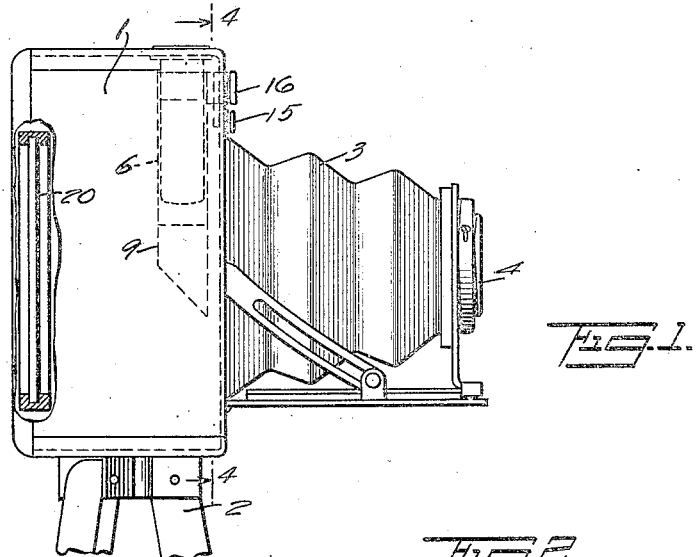
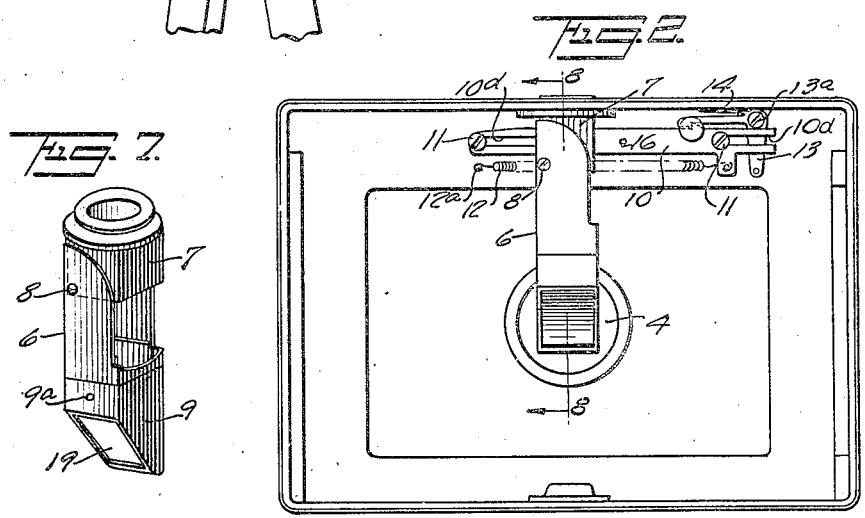
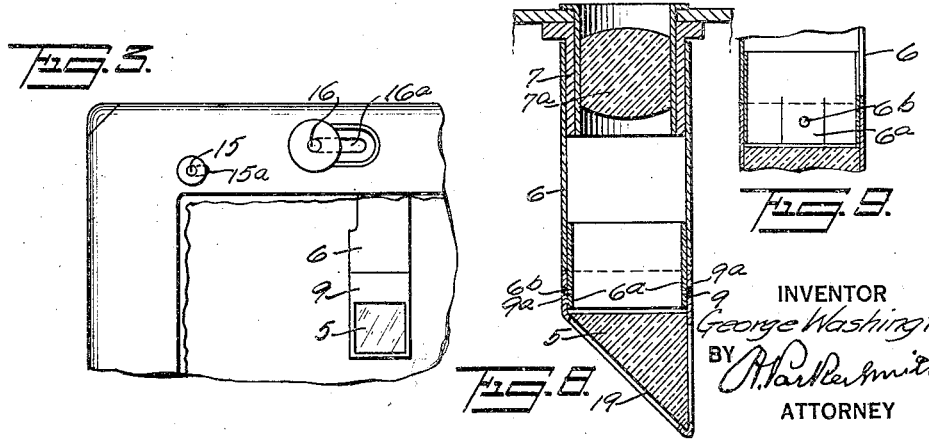
INVENTOR
George Washington
BY
R. Parker Smith
ATTORNEY June 7, 1927.
G. WASHINGTON
FOCUSING DEVICE FOR CAMERAS
Filed Feb. 1, 1926
1,631,299
3 Sheets-Sheet 2
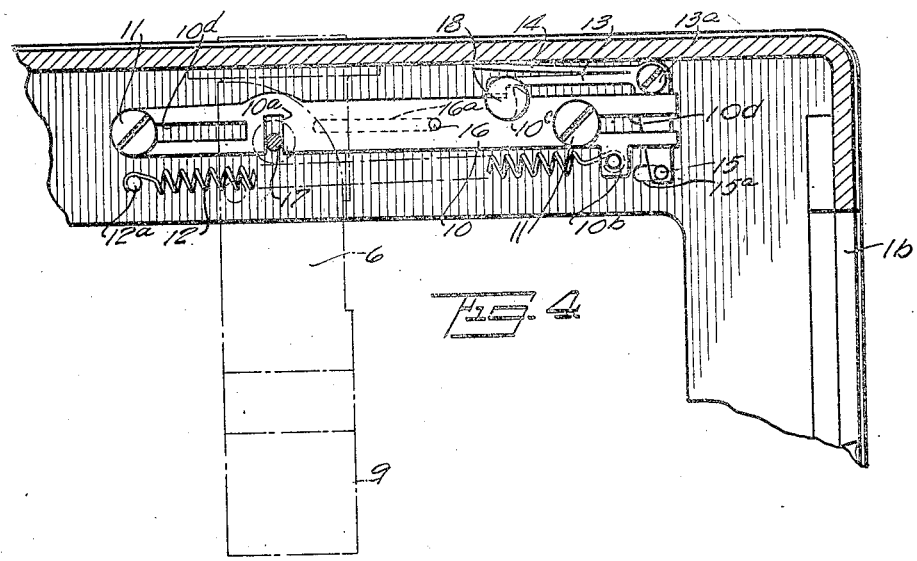
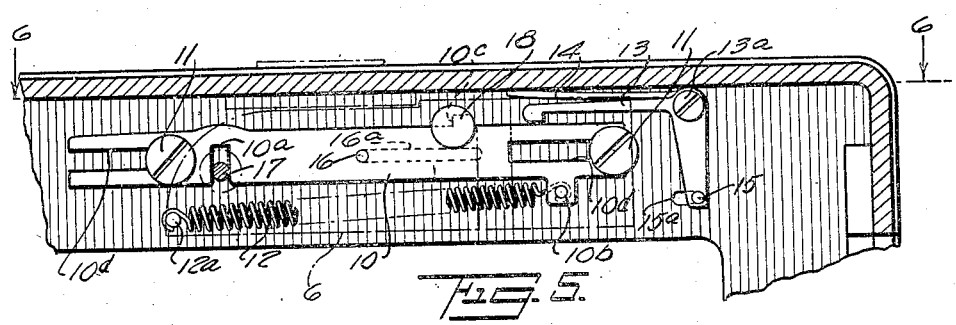
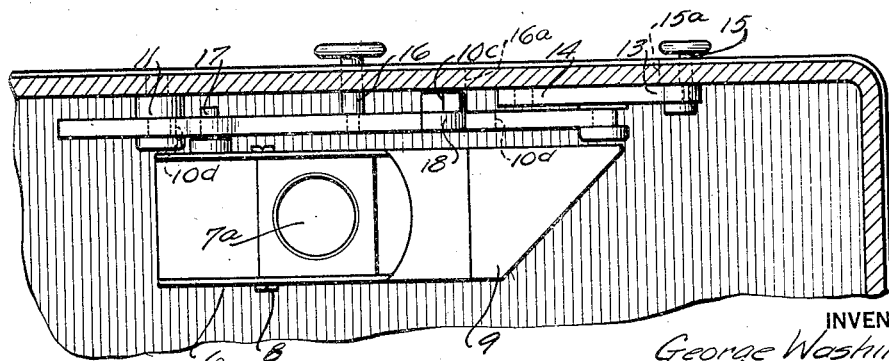
INVENTOR
George Washington
BY
ATTORNEY

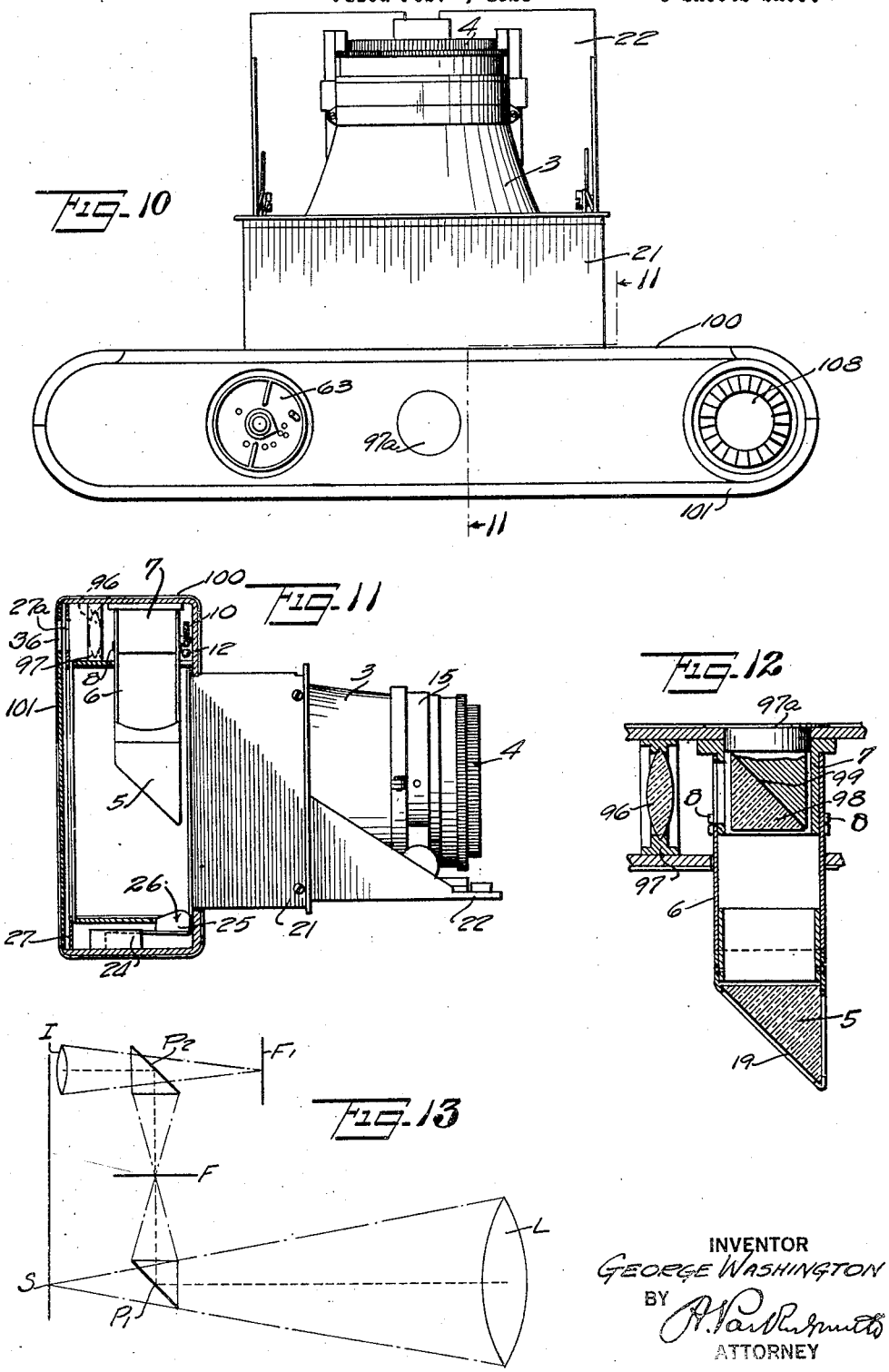

Patented June 7, 1927.

1,631,299

UNITED STATES PATENT OFFICE.

GEORGE WASHINGTON, OF BROOKLYN, NEW YORK.

FOCUSING DEVICE FOR CAMERAS.

Application filed February 1, 1926. Serial No. 85,128.

This invention relates generally to photographic cameras, but is more particularly designed to produce a simple apparatus for finding the object to be photographed and accurately focusing the objective lens of a camera upon said object without the use of the ground glass or other devices heretofore employed. To this end the preferred embodiment of the invention herein shown and described comprises one or more mirror or reflecting surfaces, preferably applied to the faces of glass prisms, at least one of which prisms is carried upon a swinging support in the interior of the camera adapted to be either swung into the focal axis of the lenses or out of the field of the lenses, and means for permitting the operator to view the object through said objective lens as reflected by said mirror or mirrors when one of them is in the first above mentioned position. The best form of apparatus at present known to me embodying my invention together with certain modifications thereof, are illustrated in the accompanying three sheets of drawings, in which:

Fig. 1 is a side elevation of a camera, with parts broken away, employing only one mirror.

Fig. 2 is a rear elevation with the back plate removed.

Fig. 3 is a detail front view, parts being broken away.

Fig. 4 is an enlarged detail section on line 4—4 of Fig. 1, showing parts in position for focusing the lenses.

Fig. 5 is a similar section showing parts in the position assumed during exposure of the plate.

Fig. 6 is a horizontal section on line 6—6 of Fig. 5.

Fig. 7 is a detail perspective view of the glass prism and supporting members.

Fig. 8 is an enlarged cross section on line 8—8 of Fig. 2.

Fig. 9 is a detail cross section on a plane at right angles to that on which the section shown in Fig. 8 is taken, with parts broken away.

Fig. 10 is a plan view of a slightly modified form of camera designed for use with rolls of photographic film.

Fig. 11 is a side elevation and partial longitudinal vertical section on irregular line 11—11 of Fig. 10, showing a modified form of finding and focusing apparatus employing two mirrors.

Fig. 12 is an enlarged detail section of the prisms and eye-piece lens used in this modification, and Fig. 13 is a diagram showing the location of the focal planes of the lenses during their reflection by two mirrors in the focusing operation.

Throughout the drawings like reference characters indicate like parts. 1 represents a camera casing generally, and $1^a$ any convenient form of back plate therefor, 20 represents a sensitized plate which may be inserted in the usual way. 2 is a supporting tripod, 4 the lenses, and 3 the bellows extension connecting the lenses with the interior of the camera casing.

When finding the object and focusing the lenses so as to get a clear view of it, the image, instead of being projected upon the usual ground glass plate at the back of the camera, is reflected upward by the film 19 of quicksilver on the back of glass prism 5 supported in the holder 9 which slips on to the lower end of the swinging member 6 which is open at one side for the greater portion of its length and is pivoted at 8 to the nipple 7 which also serves as the holder for a magnifying lens or eye-piece $7^a$. The particular means here illustrated for removably supporting the prism holder 9 from the lower end of swinging member 6, comprises spring tongues $6^a$ in the lower end of member 6, (see Figs. 8 and 9) provided with pins $6^b$, adapted to engage holes $9^a$ in the prism holder 9 when the latter is slid up into the position shown in Figs. 7 and 8.

The preferred means for holding the prism 5 down in operative position in the focal axis of the lenses 4 during the focusing operation, and for swinging it quickly out of the field of the lenses 4 before the sensitized plate is exposed for the purpose of taking the picture is shown in detail in Figs. 2, 4, 5 and 6. They comprise a horizontal slide bar 10 having longitudinal slots $10^d$, which are engaged by guide pins 11, 11, set in the inner surface of the camera casing 1, and means for sliding said bars on said pins. Said slide bar has a transverse notch $10^a$ engaging a pin 17 carried by member 6, and the tension spring 12 is fastened to the camera casing at one end by pin $12^a$, and at the other end connected to the lug $10^b$ on the under side of the bar 10. Obviously, when the bar 10 is free to slide, spring 12 will pull it to the left, (looking at Figs. 2, 4, 5 and 6) and then vertical slot 10ª, engaging pin 17, will swing member 6 and the prism carried by it up into the position shown in Figs. 5 and 6 and out of the field of lenses 4. A pin 16 carried by bar 10, extends out through slot 16ª in the camera casing 1 so that it may be grasped by the operator and employed as a means for forcing bar 10 to the right in the position shown in Figs. 2 and 4 (which is the left in Fig. 3), thereby swinging member 6 down into the vertical position shown in full lines in Figs. 2 and 3 and in broken lines in Fig. 4. When this is done, the beveled projection 10ᶜ extending laterally from a disc 18 set in the upper edge of the bar 10 is caught by the bell-crank latch 13, pivoted at 13ª to the camera casing and normally held down in engaging position by spring 14. There is a pin or trigger 15 carried by the other arm of bell-crank latch 13 and projecting through a short slot 15ª in the camera casing 1 so that when the operator pushes said pin or trigger to the left, it swings bell-crank latch 13 in a clockwise direction, (looking at Figs. 2, 4, 5 and 6) and frees the latch from the beveled projection or lug 10ᶜ.

The finding and focusing operation for a camera equipped with the above described apparatus is as follows:

The parts being in the position shown in Figs. 5 and 6, the operator pushes the pin 16 to the right, (to the left in Fig. 3) thereby moving bar 10 into the position shown in Fig. 4 and further extending spring 12, until the latch 13 drops down over projection 10ᶜ and locks the parts in that position. This operation has swung member 6 and prism 5 down into the position shown in Figs. 2, 3 and 4 with the prism in the focal axis of the lenses 4. The operator, on looking down through lens 7ª, sees an image of the object projected through lenses 4 and reflected by the mirror film 19 carried by prism 5 and can then accurately focus said lenses 4. Then, at or before the instant of releasing the shutter of the camera (not shown), he pushes pin 15 to the left, (looking at Figs. 4, 5 and 6,—to the right in Fig. 3), thereby lifting latch 13 and freeing bar 10 so that it is quickly slid into the position shown in Fig. 5, thereby swinging member 6, and prism 5 up into their horizontal positions shown in Figs. 5 and 6, and out of the field of lenses 4, so that when the shutter is opened the same sharply defined picture of the object is then projected on sensitized plate 20 and without interference from member 6 and prism holder 9.

Considering the essential elements of the above described structure it is apparent that the magnifying lens 7ª corresponds to the eye-piece of a reflecting telescope, the adjustable lenses 4 correspond to the adjustable lenses or object glass of such telescope, and that the path of the light rays through said lenses 4 and 7ª is bent at right angles by the film of light-reflecting material 19 applied to the rear face of prism 5. The plane of the reflecting surface so formed is, as shown, inclined 45 degrees to the axes of both lenses 4 and 7ª, and the cross section of said prism 5 is preferably that of a right-angled isoceles triangle with the reflecting film 19 applied to that face which forms the base of the isoceles triangle as shown in Fig. 8.

Among the advantages of my invention may be mentioned the following: While the camera may be made of small size and very compact when collapsed, the telescopic finding and focusing apparatus described enables the operator to accurately focus lenses 4, without the use of any ground glass screen and instead of having to estimate the distance and then focus the lens approximately for that distance by rule, as is the case with ordinary pocket cameras. The use of the prism with the reflecting film 19 on its inclined surface produces a clear reflection of the image to the eye of the operator, there being no double reflection as is usually the case when an ordinary inclined mirror is used for this purpose, the front surface of such mirror producing one reflection and the reflecting surface on its back another. The vertical face of the prism 5 through which the rays of light enter being at right angles to said rays and the horizontal face through which the reflected rays pass to the eye-piece 7ª being also at right angles to said reflected rays, there is no refraction of these rays either when entering or when leaving the prism. The mounting of the prism on a swinging member used as a part of the finding mechanism and movable in a plane parallel to the sensitized surface reduces the space occupied by this portion of the apparatus to the smallest possible amount.

Various changes evidently could be made in the details of the particular embodiments of the various sub-combinations herein illustrated and described without departing from the principle of the invention so far as the general method of operation and co-operation herein indicated is preserved.

Any desired form of shutter for normally preventing the light rays from reaching sensitized surface 20 may be used. Consequently I have not herein illustrated any form of shutter. Preferably that shown and described in my pending application Serial No. 85,129 filed of even date herewith, would be employed.

It is understood, of course, that the eye-piece lens 7ª should have a focal length such that its focal plane will exactly coincide with the focal plane of the objective lens 4, reflected from the mirror surface 19. Of course, also, the distances from the objective lens 4 to the film or sensitized plate 20, is such that when the mirror and prism 5 are swung out of the field of the lens, said focal plane will coincide with the surface of plate 20 in the usual way.

Figs. 10 to 13 illustrate a slightly modified form of camera designed for use with rolls of photographic film and having a second reflecting prism so placed that the line of sight through the eye-piece lens in finding and focusing the camera may be horizontal instead of vertical, as is shown in the form illustrated in Figs. 1 to 7. In these figures of the drawing, 100 represents the main casing with a removable back 101, and 21 is a telescoping section of the casing into which the objective lens 4 and the collapsible hood 3 may be folded. 108 is one of the buttons by which the take-up spool for the film may be operated in the manner illustrated and described in my pending application Serial No. 85,130 filed of even date herewith, and 63 is a cup-shaped disc for setting and winding the shutter curtains, preferably also of the character described and illustrated in my said co-pending application Serial No. 85,129.

In this modification the rays of light entering through objective lens 4 are reflected upward by the film of quicksilver 19 on the back of prism 5 but, instead of passing onward and upward to the eye of the operator, they are again reflected by a similar reflecting film 99 on the back of the second prism 98 in a horizontal direction to an eye-piece lens 96 set in a horizontal thimble 97 in line with the opening 27ª of the shutter casing 27, and the opening 36 in the back 101 of the main casing. The photographic film is supported and passes between the rear of the shutter casing 27 and the inside face of back 101, as explained in my said co-pending application Serial No. 85,130, and the swinging support 6 permits the lower prism 5 to be swung down into the focal axis of the lens 4 during the finding and focusing operation and then swung up out of the field of said lens just before the shutter is operated, all in the manner previously described.

The particular modification of my invention shown in these Figs. 10 to 13 inclusive, involving the use of two or more reflectors, is not herein claimed but forms the subject matter of a divisional application Serial No. 158,862, filed by me January 4, 1927.

In this form of camera the objective lens 4 is supported by a carriage 15 which may be pulled out upon the hinged platform 22 when a photograph is being taken, or pushed back into the telescoping section 21 when it is desired to close the camera by folding up the swinging platform 22 and pushing inward the said telescoping section. Telescoping section 21 is prevented from being pulled entirely out of main casing 100 by the rear flange 26 which also cooperates with the cam-faced block 25 carried by spring 24 to hold the telescoping section 21 in extended position, as shown.

In this modification the focal length of lens 96 should be such that its focal plane, as reflected by the mirror surface 99, will coincide with the focal plane of the objective lens 4 when reflected upward by the mirror surface 19. Also the distance from the center of surface 19 to the common reflected focal planes of the two lenses, should equal the distance from said center to the plane of the sensitized surface on which the photographic action is to take place when the shutter is opened. That is to say, referring to Fig. 13, distance $P_1-F$ should equal distance $P_1-S$, the lower prism being represented by $P_1$, the upper prism by $P_2$, the sensitized surface of the film by $S$, the objective lens by $L$, eye-piece lens by $I$, and its normal focal plane by $F_1$. Obviously the distance $P_2-F$ should equal that $P_2-F_1$.

The focal plane shutter mechanism (not herein illustrated) may be the same as that illustrated and described in my said co-pending application Serial No. 85,129, the curtains forming said shutter moving in front of the shutter retaining frame or casing 27.

97ª is a removable plug seated in an opening in the top of the main casing 100 in line with the swinging prism supporting member 6, which plug supports the second prism 98. This plug 97ª and prism 98 may be removed as a unit for purpose of cleaning the prism faces. Also, if it is desired to use only a single prism, an eye-piece lens may be substituted for prism 98, as shown in Figs. 1 to 7.

The horizontal sliding bar 10, is operated by a spiral spring 12 (as indicated in Fig. 11) to oscillate the swinging member 6, as previously described.

Having described my invention, I claim:

1. In a camera having an enclosing casing provided with suitable apertures in the walls thereof, an objective lens supported in line with one of said apertures, and means for supporting inside said casing a sensitized film or plate in the focal plane of said lens, the combination, with the above recited elements, of a second lens in line with a second aperture in said casing, and reflecting apparatus located in said casing, separated from said second lens only by an open air space and so inclined and spaced apart from both said lenses as to cause the focal plane of light rays entering through said objective lens and reflected by said apparatus to coincide with the focal plane of said second lens at a point located in said open air space, whereby the object to be photographed can be viewed clearly and directly during the finding and focusing operations, as through a telescope.

2. A combination such as defined in claim 1 in which said reflecting apparatus comprises a glass prism of triangular cross section with a film of reflecting material applied to one face of said prism which is inclined to the focal axis of said objective lens.

3. The combination, with a structure such as defined in claim 1, of a projecting hollow member mounted in said casing, in the free end of which member said reflecting apparatus is supported, the axis of said hollow member being parallel with the reflected light rays.

4. The combination with a structure such as defined in claim 1, of a hollow swinging member, one end of which is hinged to the interior of said camera casing, while said reflecting apparatus is mounted near the other, free end of said member.

5. The combination, with a structure such as defined in claim 1, of a swinging hollow member, one end of which is hinged to the interior of said casing, while reflecting apparatus is mounted near the other, free end thereof, a spring normally tending to swing said member into parallelism with one side of said casing, means adapted to hold said member swung outwardly from said casing side so that said reflecting apparatus will be within the field of said objective lens, and a manually operated device for releasing said holding means.

6. The combination, with a structure such as defined in claim 1, of a swinging hollow member, one end of which is hinged to the interior of said casing, while said reflecting apparatus is mounted near the other, free end thereof, a spring normally tending to swing said member into parallelism with one side of said casing, and a spring-pressed pawl adapted to hold said member in a position such that said reflecting apparatus will be in the field of said objective lens, which pawl has a projection extending through the casing, and by which projection it may be manually controlled.

7. In a camera having a box-like casing provided with a collapsible hood extending from one face thereof, a slot in the opposite wall of said casing and an objective lens located in the outer end of said hood, the combination with the said above recited elements of an inclined mirror pivotally supported in the interior of said casing and hinged to swing in a plane parallel to said face down into line with the focal axis of the above mentioned lens, a sliding bar connected to said hinged support having a laterally extending pin passing through said slot to the exterior of said casing, a spring normally tending to pull said bar in a direction which will swing said support out of the field of said lens, a spring latch for holding said bar in the position occupied when said support is swung into the field of said lens, and means for tripping said latch projecting through said camera casing.

8. In a focusing device for cameras, a glass prism, the cross section of which is a right-angled isoceles triangle, having a film of reflecting material on the face which forms the base of such triangle, combined with an objective lens so located that its focal axis will be perpendicular to the prism face which forms one side of said triangle, and means separated from said prism only by an open air space for conveying directly to the eye of an observer the image formed in said open space at the focal plane of said lens by light rays reflected through the third prism face.

9. In a camera having a box-like casing provided with a collapsible hood extending from one face thereof, a slot in the opposite wall of said casing and an objective lens located in the outer end of said hood, the combination with the said above recited elements of apparatus pivotally supported in the interior of said casing hinged to swing in a plane parallel to said face into and out of the field of the above mentioned lens, reflecting means supported by said pivoted apparatus adapted to cooperate with the light rays projected through said lens, a sliding bar connected to said hinged apparatus having a laterally extending pin passing through said slot to the exterior of said casing, a spring normally tending to pull said bar in a direction which will swing said apparatus out of the field of said lens, a spring latch for holding said bar in the position occupied when said apparatus is swung into the field of said lens, and means for tripping said latch also projecting through said camera casing.

10. In a camera having an enclosing casing provided with an aperture in the front thereof, an objective lens supported in line with said aperture, a second aperture in the top thereof, and a second lens supported in line with said second aperture, the combination, with the above recited elements, of reflecting apparatus located in said casing, separated from said second lens only by an open air space and so inclined and spaced apart from both said lenses as to cause the focal plane of light rays entering through said objective lens and reflected by said apparatus to coincide with the focal plane of said second lens at a point located in said open air space, whereby the object to be photographed can be viewed clearly and directly during the finding and focusing operations, as through a telescope.

GEORGE WASHINGTON.